US 6,657,581 B1

(12) United States Patent
Lippert et al.

(10) Patent No.: US 6,657,581 B1
(45) Date of Patent: Dec. 2, 2003

(54) AUTOMOTIVE LANE CHANGING AID INDICATOR

(75) Inventors: Delbert Lippert, Cobden (CA); H. Barteld Van Rees, Needham, MA (US); Michael Joseph Delcheccolo, Westford, MA (US); Walter Gordon Woodington, Lincoln, MA (US); Mark E. Russell, Westford, MA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/930,874

(22) Filed: Aug. 16, 2001

Related U.S. Application Data
(60) Provisional application No. 60/226,160, filed on Aug. 16, 2000.

(51) Int. Cl.[7] .......................... G01S 13/00; B60T 7/16; B62D 1/24
(52) U.S. Cl. ........................ 342/70; 180/169
(58) Field of Search ................ 342/70, 71, 72; 180/167, 169; 356/3.01–5.15

(56) References Cited

U.S. PATENT DOCUMENTS

| 3,697,985 A | * 10/1972 | Faris et al. ............... 343/5 |
| 4,063,243 A | 12/1977 | Anderson et al. |
| 4,209,791 A | 6/1980 | Gerst et al. |

(List continued on next page.)

FOREIGN PATENT DOCUMENTS

| DE | 196 32 889 | 2/1998 |
| DE | 195 23 693 | 5/1998 |
| DE | 198 55 400 | 12/1998 |

(List continued on next page.)

OTHER PUBLICATIONS

International Search Report of PCT Application No. PCT/US01/25676 dated Dec. 21, 2001.
Partial International Search Report of PCT Application No. PCT/US01/25642 dated May 27, 2002.
International Search Report of PCT Application No. PCT/US01/25594 dated May 7, 2002.

(List continued on next page.)

Primary Examiner—Thomas H. Tarcza
Assistant Examiner—Brian Andrea
(74) Attorney, Agent, or Firm—Daly, Crowley & Mofford, LLP

(57) ABSTRACT

There is disclosed a vehicle equipped with two multibeam electronically scanned radar systems that function as side object detection systems. The transmit/receive modules of the radar are illustratively located on right and left side panels of the vehicle at the rear of its body. Each radar system generates eight equal-angle beams. The radar systems are programmed so that targets are detected only within a predefined range for each of its eight beam patterns corresponding to the adjacent highway lane. As an overtaking vehicle approaches in an adjacent lane, its approach is detected sequentially by the beams on that side of the vehicle. Each radar system generates eight signals, corresponding to the eight beams positions, which are coupled individually to eight LEDs configured in an array. Detection of an overtaking vehicle within a scanned beam causes illumination of a corresponding LED. Thus, the driver of a host vehicle can easily determine the presence and position of an overtaking vehicle in an adjacent lane relative to his or her own from the position of the illuminated LED or LEDs in the array, and can also determine the closing speed of the overtaking vehicle from the rapidity of the transition of LEDs in the array being illuminated. In a preferred embodiment, the arrays are affixed to the outside mirrors in a vertical columnar configuration.

31 Claims, 3 Drawing Sheets

U.S. PATENT DOCUMENTS

| | | | |
|---|---|---|---|
| 4,246,585 A | | 1/1981 | Mailloux |
| 4,349,823 A | * | 9/1982 | Tagami et al. .................. 343/7 |
| 4,414,550 A | | 11/1983 | Tresselt |
| 4,507,662 A | | 3/1985 | Rothenberg et al. |
| 4,962,383 A | | 10/1990 | Tresselt |
| 5,008,678 A | | 4/1991 | Herman |
| 5,235,316 A | * | 8/1993 | Qualizza ..................... 340/436 |
| 5,249,157 A | | 9/1993 | Taylor |
| 5,325,096 A | | 6/1994 | Pakett |
| 5,339,075 A | * | 8/1994 | Abst et al. .................. 340/903 |
| RE34,773 E | | 11/1994 | Domborwski |
| 5,394,292 A | | 2/1995 | Hayashida |
| 5,396,252 A | | 3/1995 | Kelly |
| 5,410,745 A | | 4/1995 | Friesen et al. |
| 5,479,173 A | | 12/1995 | Yoshioka et al. |
| 5,517,196 A | | 5/1996 | Pakett et al. |
| 5,517,197 A | | 5/1996 | Algeo et al. |
| 5,521,579 A | * | 5/1996 | Bernhard .................... 340/438 |
| 5,530,447 A | | 6/1996 | Henderson et al. |
| 5,583,495 A | * | 12/1996 | Ben Lulu ................... 340/904 |
| 5,613,039 A | | 3/1997 | Wang et al. |
| 5,619,208 A | | 4/1997 | Tamatsu et al. |
| 5,625,362 A | | 4/1997 | Richardson |
| 5,627,510 A | | 5/1997 | Yuan |
| 5,633,642 A | | 5/1997 | Hoss et al. |
| 5,654,715 A | * | 8/1997 | Hayashikura et al. ......... 342/70 |
| 5,675,345 A | | 10/1997 | Pozgay et al. |
| 5,689,264 A | | 11/1997 | Ishikawa et al. |
| 5,712,640 A | * | 1/1998 | Andou et al. ................. 342/70 |
| 5,717,399 A | * | 2/1998 | Urabe et al. .................. 342/70 |
| 5,757,307 A | | 5/1998 | Nakatani et al. |
| 5,808,728 A | * | 9/1998 | Uehara ...................... 356/5.01 |
| 5,926,126 A | | 7/1999 | Engelman |
| 5,929,802 A | | 7/1999 | Russell et al. |
| 5,940,011 A | * | 8/1999 | Agravante et al. .......... 340/903 |
| 5,959,570 A | | 9/1999 | Russell |
| 5,999,092 A | * | 12/1999 | Smith et al. ................ 340/436 |
| 5,999,119 A | | 12/1999 | Carnes et al. |
| 5,999,874 A | | 12/1999 | Winner et al. |
| 6,011,507 A | | 1/2000 | Curran et al. |
| 6,026,347 A | | 2/2000 | Schuster |
| 6,044,321 A | | 3/2000 | Nakamura et al. |
| 6,091,355 A | | 7/2000 | Cadotte, Jr. et al. |
| 6,097,931 A | | 8/2000 | Weiss et al. |
| 6,107,956 A | | 8/2000 | Russell et al. |
| 6,104,336 A | | 9/2000 | Curran et al. |
| 6,114,985 A | | 9/2000 | Russell et al. |
| 6,130,607 A | | 10/2000 | McClanahan et al. |
| 6,198,434 B1 | | 3/2001 | Martek et al. |
| 6,215,438 B1 | * | 4/2001 | Oswald et al. ................ 342/70 |
| 6,252,560 B1 | | 6/2001 | Tanaka et al. |
| 6,265,968 B1 | * | 7/2001 | Betzitza et al. ............ 340/436 |
| 6,268,803 B1 | | 7/2001 | Gunderson et al. |
| 6,360,158 B1 | | 3/2002 | Hanawa et al. |

FOREIGN PATENT DOCUMENTS

| | | |
|---|---|---|
| DE | 198 50 128 | 5/1999 |
| EP | 0 978 729 A2 | 2/1990 |
| EP | 0 398 712 | 5/1990 |
| EP | 0 484 995 | 5/1992 |
| EP | 0 642 190 A1 | 12/1993 |
| EP | 0 784 213 | 1/1996 |
| EP | 0 887 658 | 12/1998 |
| EP | 0 932 052 | 7/1999 |
| EP | 0 982 173 | 3/2000 |
| EP | 1 020 989 | 7/2000 |
| FR | 2 709 834 | 9/1993 |

OTHER PUBLICATIONS

G.S. Dow, et al. "Monolithic Receivers with Integrated Temperature Compensation Function", IEEE GaAs IC Symposium, 1991, pp. 267–269.

International Search Report of PCT Application No. PCT/US01/25682 dated May 14, 2002.

Barnett, Roy I. et al. "A Feasibility Study of Stripline–Fed Slots Arranged as a Planar Array with Circular Grid and Circular Boundary", IEEE, 1989, pp. 1510–1515.

Bhattacharyya, Arum, et al. "Analysis of Srripline–Fed Slot–Coupled Patch Antennas with Vias for Parallel–Plate Mode Suppression", IEEE Transcations on Antennas and Propagation, vol. 46, No. 4, Apr. 1998, pp. 538–545.

Clouston E.N. et al. "A Triplate Stripline Slot antenna Developed for Time–Domail Measurements on Phased Arrays", 1998, pp. 312–315.

Das, Nirod K. et al. "Multiport Scattering Analysis of General Multilayered Printed Antennas Fed by Multiple Feed Ports: Part II–Applications", IEEE, 1992, pp. 482–491.

Katehi, Pisti B. et al. "Design of a Low Sidelobe Level Stripline Fed Slot Array Covered by a Dielectric Layer", 1989, pp. 978–981.

Kimura, Yuichi et al. "Alternating Phase Single–Layer Slotted Waveguide Arrays at 25GHz Band", IEEE, 1999, pp. 142–145.

Muir, A., "Analysis of Sripline/Slot Transition", Electronics Letter, vol. 26, No. 15, pp. 1160–1161.

Sakaibara, Kunio et al. "A Single Slotted Waveguide Array for 22GHz Band Radio System Mobile Base Station", IEEE, 1994, pp. 356–359.

Sangster, Alan et al. "A Moment Method Analysis of a Transverse Slot Fed by a Boxed Stripline", (No Date) pp. 146–149.

Schaubert, Daniel H. et al. "Moment Method Analysis of Infinite Stripline–Fed Tapered Slot Antenna Arrays with a Ground Plane", IEEE Transactions on Antennas and Propagation, vol. 42, No. 8, Aug. 1994, pp. 1161.

Smith, Peter "Transverse Slot Radiator in the Ground–Plane of Enclosed Stripline", $10^{th}$ International Conference on Antennas and Propagation 14.17, Apr. 1997, 5 pages.

Theron, Isak Petrus et al. "On Slotted Waveguide Antenna Design at Ka–Band", IEEE Trans. vol. 32, Oct. 1984, pp. 1425–1426.

International Search Report of PCT Application No. PCT/US01/25638 dated by May 7, 2002.

* cited by examiner

AUTOMOTIVE LANE CHANGING AID INDICATOR

CROSS-REFERENCE TO RELATED APPLICATIONS

This application claims the benefit of U.S. Provisional Application No. 60/226,160, filed on Aug. 16, 2000 and is hereby incorporated herein by reference in its entirety.

STATEMENTS REGARDING FEDERALLY SPONSORED RESEARCH

Not applicable.

TECHNICAL FIELD OF THE INVENTION

The present invention relates generally to automotive safety and, more particularly, to an apparatus that provides a driver with an indication of the position and closing speed of an overtaking vehicle in an adjacent highway lane.

BACKGROUND OF THE INVENTION

In view of the dangers associated with automotive travel, there is an ongoing need for enhanced automotive safety features. One possible area of increased automotive safety involves improving the driver's ability to see obstacles that are near his or her vehicle, but which are in locations that are difficult to observe from the driver's position, commonly referred to as "blind spots." Hereinafter, the driver's vehicle may be referred to as the "host vehicle."

Every year there is an increase in the number of vehicles on the nation's highways, particularly the roads of the Interstate Highway System. These roads are multiple lane highways, with two, three or even more lanes of travel in each direction. Vehicular traffic flows in all lanes with seemingly little regard for the principle that slower vehicles should travel in the rightmost lane and passing traffic in the left lane. In addition, a vehicle exiting such a highway may have to make two or more lane changes to reach the exit lane.

In view of the proliferation of multiple lane highways, the increase in traffic congestion, and the plethora of distractions that contribute to driver inattention, such as CDs and tapes, snacks and beverages, pagers and mobile telephones, perhaps the most likely cause of an accident while traveling on a multiple lane highway is the maneuver of changing from one lane to another.

In order to make a lane change with complete safety, a driver must have a clear indication of the presence of other vehicles in the adjacent lane to which he or she intends to enter, and must additionally be able to determine whether any such vehicles in the adjacent lane is approaching the host vehicle at a rate which would make such a maneuver unsafe.

The rear view vision of automobile and truck drivers has been enhanced by the use of mirrors to aid in determining whether obstacles are present in a blind spot. Such mirrors have been made in a variety of shapes and mounted in various locations to provide the driver with the greatest ability to detect obstacles in particular blind spots. As an example, convex outside right-side mirrors have become standard equipment on most automobiles. These convex mirrors increase the angle of the driver's vision; however, they provide a misleading indication as to the distance between the host vehicle and a sighted object. Mirrors provide the driver with some information regarding the presence of obstacles in certain of a vehicle's blind spots, but they are less useful at night and under adverse weather conditions. Furthermore, the driver must rely on visual and mental extrapolations to determine whether another vehicle sighted in a rearview mirror in an adjacent lane is closing on the host vehicle at such a rate that it would be imprudent for the host vehicle to make a lane change maneuver.

Prior art solutions to this problem include side object detectors that operate well in a static environment, but are deficient in dynamic traffic situations. As an example, in U.S. Pat. No. 5,517,196, "Smart Blind Spot Sensor With Object Ranging," a radar transceiver transmits a multi-frequency radio signal at a blind spot of the vehicle. The received reflected signal is processed to detect only those objects within a pre-established range and which are moving at approximately the same speed as the vehicle.

Such a system, while providing an indication of the presence of a moving object in or near a blind spot, fails to provide sufficient information to the driver of the host vehicle to make an informed determination as to the prudence of executing a lane change.

SUMMARY OF THE INVENTION

In view of the above-stated problems and limitations of existing automotive blind-spot detection systems and in accordance with the present invention, it has been recognized that combining the need for increased automotive safety with the usefulness and desirability of blind-spot detection leads to the problem of providing a blind-spot detection apparatus which is simple, informative, easy to use and understand, cost-effective and reliable, given the environmental and other operating conditions under which such an apparatus must operate. It would, therefore, be desirable to fill the need for a device that provides an easily interpreted indication of the position and closing speed of an overtaking vehicle in an adjacent highway lane.

In accordance with the principles of the present invention, there is disclosed herein a safety device for an automotive vehicle. The device includes a multibeam scanning radar system having a transmit/receive module mounted on a side surface of the vehicle. The radar system provides a plurality of scanning beams at discrete angular sectors along the side of the vehicle, the radar system generating a plurality of signals signifying the presence of an obstacle within a corresponding sector. The safety device also includes an equal plurality of indicators each coupled, respectively, to one of the signals, each indicator providing a visual indication of the presence of an obstacle within a corresponding sector. The indicators are configured in an array that meaningfully displays a transition of an obstacle from one of the sectors to another.

In a preferred embodiment of the present invention, the visual indicators are configured as a column of light-emitting diodes (LEDs) affixed to the outside mirrors of the host vehicle. Further in accordance with the preferred embodiment, the multibeam electronically scanned radar system provides coverage of between 90 and 180 degrees, preferably 150 degrees, via at least four, and preferably eight, scanned beams subtending equal angles, each beam position coupled to illuminate one of an equal number of LEDs. Still further in accordance with the preferred embodiment, the host vehicle is equipped with two such multibeam electronically scanned radar systems, thus providing 90- to 180-degree coverage on both sides of the vehicle, the left and right side radar systems being coupled to LEDs in the lefthand and righthand outside mirrors, respectively.

BRIEF DESCRIPTION OF THE DRAWINGS

The foregoing features of the present invention may be more fully understood from the following detailed description, read in conjunction with the accompanying drawings, wherein.

Like reference numbers and designations in the various figures refer to identical or substantially identical elements.

DESCRIPTION OF THE PREFERRED EMBODIMENTS

Throughout this description, the preferred embodiment and examples shown should be considered as exemplars, rather than as limitations on the present invention.

Figure 1:
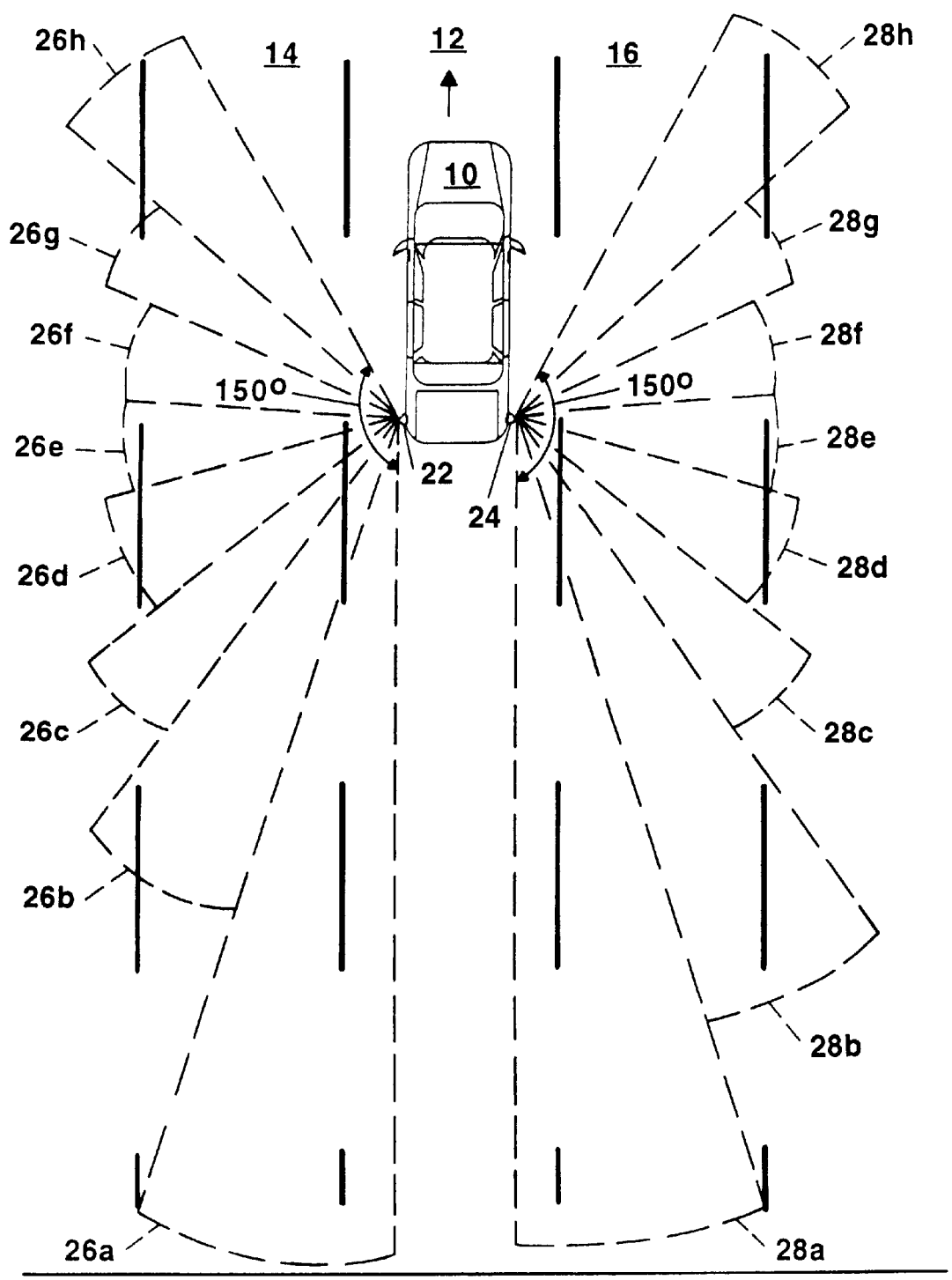
FIG. 1 illustrates a vehicle on a highway lane having multibeam electronically scanned radar systems for detecting vehicles in adjacent highway lanes.

Referring initially to FIG. 1, there is shown an overhead view of a host vehicle 10 traveling along highway lane 12 in the direction shown by the bold arrow. Highway lanes 14 and 16, adjacent lane 12 on its left and right sides, respectively, are both intended for travel in the same direction as vehicle 10 in lane 12.

Vehicle 10 is generally depicted as an automobile, but the present invention is intended to provide enhanced safety also for drivers of buses, recreation vehicles (RVs), trucks, tractor-semitrailer combinations, and other highway automotive vehicles. In fact, the present invention is particularly useful for tractors hauling one or more semitrailers, as it is known that the blind spots for such vehicles increase during their turning maneuvers.

In the present example, vehicle 10 is equipped with two identical multibeam electronically scanned radar systems 18 and 20 that function as side object detection systems. These radar systems, which are not the focus of the present invention, electrically scan across 150 degrees with eight beams subtending equal angles. While these numbers are provided only for the purpose of this example, it is suggested that there be at least four beams and that the scanning range is preferably between 90 and 180 degrees.

The transmit/receive modules 22 and 24 of radar systems 18 and 20, respectively, are illustratively located on side panels of vehicle 10 at the rear of its body. Module 22 generates beams 26a, 26b, 26c, 26d, 26e, 26f, 26g and 26h, referred to collectively as beams 26, along the left side of vehicle 10. Module 24 generates beams 28a, 28b, 28c, 28d, 28e, 28f, 28g and 28h, referred to collectively as beams 28, along the right side of vehicle 10. The 150-degree overall scan patterns of beams 26 and 28 are shown in FIG. 1 as extending from a line opposite the direction of travel of vehicle 10 to a line 30 degrees short of the direction of travel of vehicle 10; however, this is not a limitation on the invention as either or both of modules 22 and 24 may be positioned to produce a more forward-facing field of view.

Radar systems 18 and 20 are provided with the capability for programmable antenna patterns. That is, they can be programmed so that targets are detected only within a predefined range for each of its eight beam patterns. In the present example, the detection limitation is provided in the receive portion so that the beam transmitters consume power uniformly over the range of scan. Although eight beams are here described, it should be understood that more or fewer than eight beams can also be used. For example, seven beams can be used. An example of antenna system which provides seven beams is described in copending patent application Ser. No. 09/932,574 entitled "Switched Beam Antenna Architecture", filed on even date herewith, assigned to the assignee of the present invention and incorporated herein by reference in its entirety. An example of a radar system which provides changing lane coverage is described in copending patent application Ser. No. 09/930,867 entitled "Technique for Changing a Range Gate and Radar Coverage", filed on even date herewith, assigned to the assignee of the present invention and incorporated herein by reference in its entirety.

In accordance with the present invention, beam 26a, the most rearward scanned beam on the left side of vehicle 10, is programmed to look for targets in a range of up to approximately 30 meters (approximately 100 feet) in the present example. This distance provides coverage of targets in highway lane 14 while avoiding detection of targets that may be to the left of lane 14.

Beam 26b, the next most rearward scanned beam on the left side of vehicle 10, is programmed to look for targets in a somewhat shorter range, the actual distance being established by the need for target detection coverage in lane 14 while avoiding detection of targets that may be to the left of lane 14.

Similarly, beams 26c through 26h are programmed to look for targets in particular ranges established by the need for target detection coverage in lane 14 while avoiding detection of targets that may be to the left of lane 14.

Also in accordance with the present invention, beam 28a, the most rearward scanned beam on the right side of vehicle 10, is programmed to look for targets in a range of up to approximately 30 meters (approximately 100 feet) in the present example. This distance provides coverage of targets in highway lane 16 while avoiding detection of targets that may be to the right of lane 16.

Beam 28b, the next most rearward scanned beam on the right side of vehicle 10, is programmed to look for targets in a somewhat shorter range, the actual distance being established by the need for target detection coverage in lane 16 while avoiding detection of targets that may be to the right of lane 16.

Similarly, beams 26c through 26h are programmed to look for targets in particular ranges established by the need for target detection coverage in lane 16 while avoiding detection of targets that may be to the right of lane 16.

In this application, a target is a vehicle that is overtaking vehicle 10 from behind in an adjacent highway lane. As an overtaking vehicle approaches in lane 14, it is first detected by beam 26a, then by beam 26b, then by beam 26c, etc. An overtaking vehicle approaching in lane 16 would first be detected by beam 28a, then by beam 28b, then by beam 28c, etc.

Figure 2:
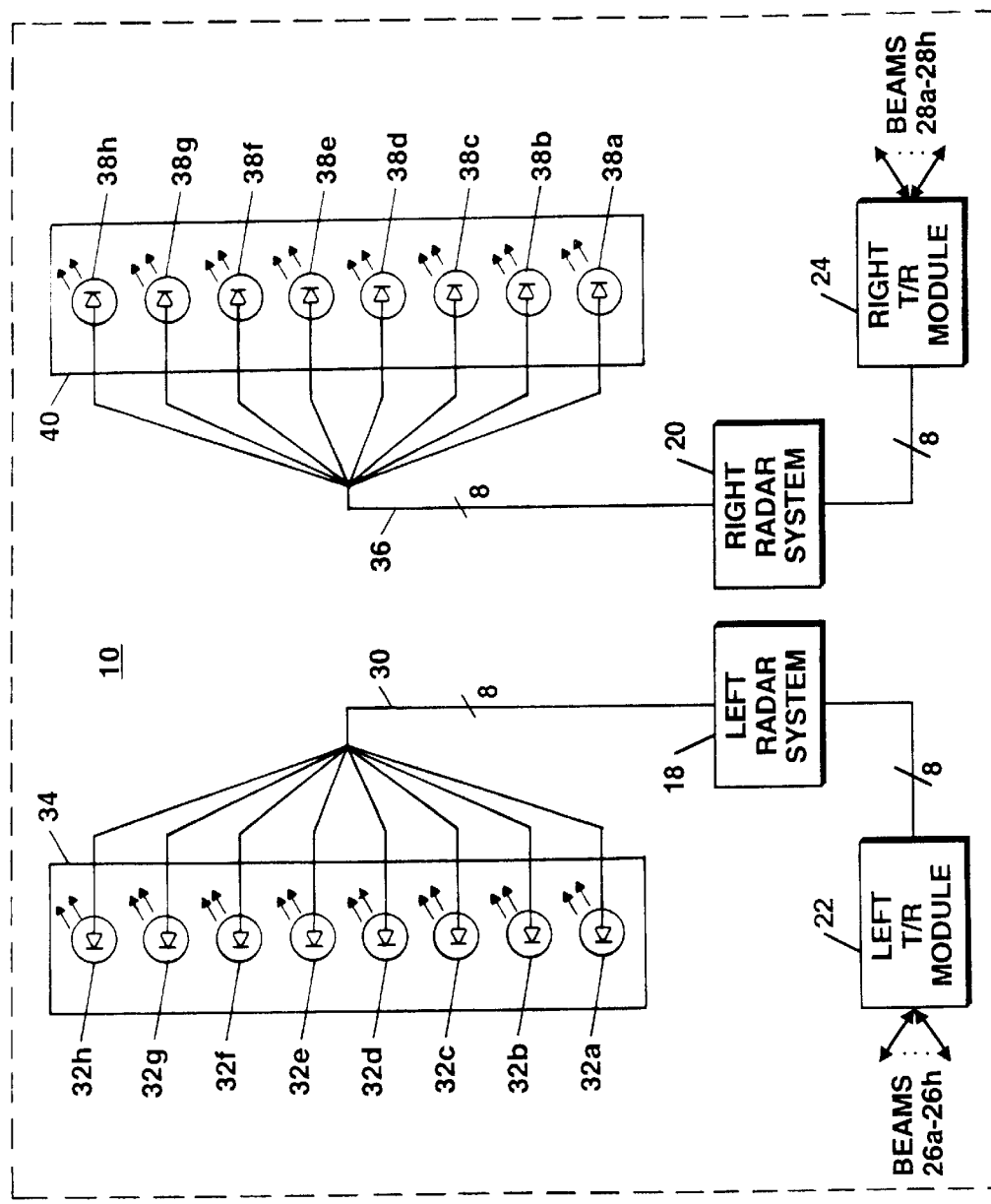
FIG. 2 is a block diagram of the present invention employing the radar system of FIG. 1.

Referring now to FIG. 2, there is shown a block diagram of the present invention employing the side object detection systems of FIG. 1. Radar system 18, responsive to transmit/receive module 22, provides, in the present example, eight output signals on signal lines referred to collectively as signal lines 30. Each signal is indicative of target detection in a sector of highway lane 14, immediately to the left of the lane occupied by host vehicle 10. The eight signal lines 30 are individually coupled to an equal number of visual indicators which, in the preferred embodiment, are light-emitting diodes (LEDs) 32a, 32b, 32c, 32d, 32e, 32f, 32g and 32*h*, referred to collectively as LEDs 32. LEDs 32 are configured in an array 34, which imparts meaningful information to a driver of host vehicle 10. In array 34 shown in FIG. 2, the signal from beam 26*a* (seen in FIG. 1) is coupled to LED 32*a* at the bottom of array 34. The signal from beam 26*b* is coupled to LED 32*b* in the second position from the bottom of array 34. Similarly, the remainder of the signals on signal lines 30 are coupled to corresponding LEDs 32 culminating with the signal from beam 26*h* being coupled to LED 32*h* at the top of array 34.

Using this arrangement, a vehicle overtaking host vehicle 10 in left adjacent lane 14 will initially be detected in beam 26*a*, causing illumination of LED 32*a*. As the overtaking vehicle moves closer to host vehicle 10, it is detected in beam 26*b*, causing LED 32*b* to be illuminated. As the overtaking vehicle moves closer to, then alongside, and eventually passing host vehicle 10, the LEDs of array 34 illuminate in sequence vertically up the column. Thus, the driver of host vehicle 10 can easily determine the presence and position of an overtaking vehicle in left adjacent lane 14 relative to his or her own from the position of the illuminated LED or LEDs in array 34, and can also determine the closing speed of the overtaking vehicle from the rapidity of the transition of LEDs in array 34 being illuminated.

While not a necessary requirement of the present invention, the preferred embodiment also includes a second radar system 20, responsive to transmit/receive module 24, which provides, in the present example, eight output signals on signal lines that are referred to collectively as signal lines 36. Each signal is indicative of target detection in a sector of highway lane 16, immediately to the right of the lane occupied by host vehicle 10. The eight signal lines 36 are individually coupled to an equal number of visual indicators which, in the preferred embodiment, are light-emitting diodes (LEDs) 38*a*, 38*b*, 38*c*, 38*d*, 38*e*, 38*f*, 38*g* and 38*h*, referred to collectively as LEDs 38. LEDs 38 are configured in an array 40 that imparts meaningful information to a driver of host vehicle 10. In array 40 shown in FIG. 2, the signal from beam 28*a* (seen in FIG. 1) is coupled to LED 38*a* at the bottom of array 40. The signal from beam 28*b* is coupled to LED 38*b* in the second position from the bottom of array 40. Similarly, the remainder of the signals on signal lines 36 are coupled to corresponding LEDs 38 culminating with the signal from beam 28*h* being coupled to LED 38*h* at the top of array 40.

Using this arrangement, a vehicle overtaking host vehicle 10 in right adjacent lane 16 will initially be detected in beam 28*a*, causing illumination of LED 38*a*. As the overtaking vehicle moves closer to host vehicle 10, it is detected in beam 28*b*, causing LED 38*b* to be illuminated. As the overtaking vehicle moves closer to, then alongside, and eventually passing host vehicle 10, the LEDs of array 40 illuminate in sequence vertically up the column. Thus, the driver of host vehicle 10 can determine the position of an overtaking vehicle relative to his or her own from the position of the illuminated LED or LEDs in array 40, and can also determine the closing speed of the overtaking vehicle in right adjacent lane 16 from the rapidity of the transition of LEDs in array 40 being illuminated.

Figure 3:
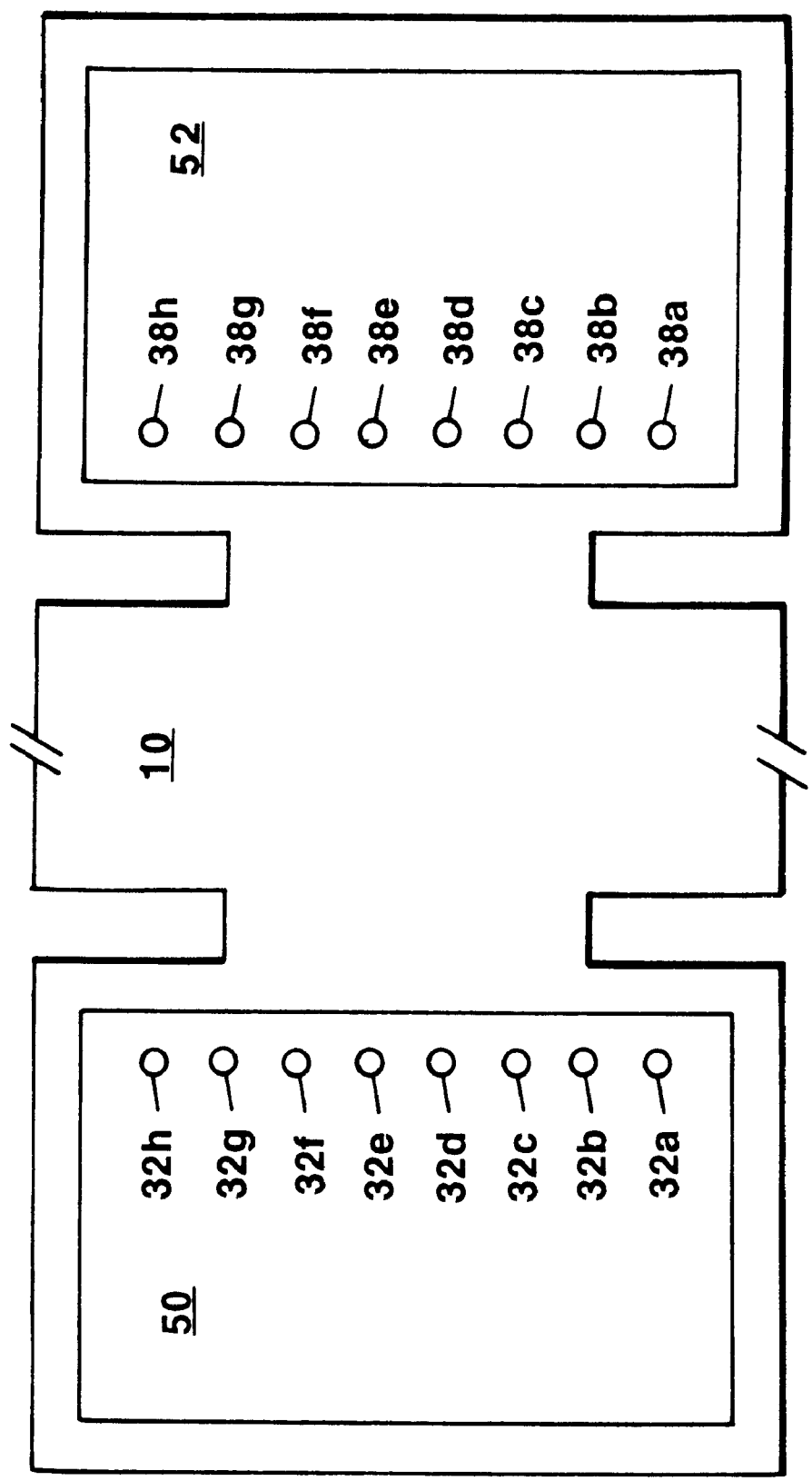
FIG. 3 illustrates left and right outside mirrors having LED indicators as the visual display array in accordance with a preferred embodiment of the present invention.

Referring now to FIG. 3, there is shown vehicle 10 (in phantom) having left and right outside mirrors 50 and 52, each of which has LED indicators as the visual display array in accordance with a preferred embodiment of the present invention. In this example, array 34 is positioned in a column vertically on the righthand side of left outside mirror 50 (adjacent to the body of vehicle 10). LEDs 32 are embedded into or under the surface of mirror 50, with LED 32*a* being the bottommost, LED 32*b* being the next bottommost, and so on, with LED 32*h* being the topmost.

Also in this example, array 40 is positioned vertically on the lefthand side of right outside mirror 52 (adjacent to the body of vehicle 10). LEDs 38 are embedded into or under the surface of mirror 52, with LED 38*a* being the bottommost, LED 38*b* being the next bottommost, and so on, with LED 38*h* being the topmost.

Although in the preferred embodiment of the present invention, the LED indicators of arrays 34 and 40 are affixed to the outside mirrors 50 and 52, respectively, of host vehicle 10, it will be understood that aftermarket installations of the present invention would be significantly more costly if replacement of the outside mirrors and their concomitant wiring harnesses were required. For this reason, LED arrays 34 and 40 may alternatively be positioned at any location visible to the driver such that the position and closing speed of an overtaking vehicle in an adjacent lane would be unambiguously discerned. For instance, mounting LED arrays 34 and 40 on or adjacent the dashboard instrument cluster, to the left and right of center or in such a way that targets in the left adjacent lane are clearly distinguishable from targets in the right adjacent lane, would provide useful and clearly visible information to the driver, such mounting lending itself to being a relatively inexpensive and simple after market installation procedure.

While the principles of the present invention have been demonstrated with particular regard to the structures disclosed herein, it will be recognized that various departures may be undertaken in the practice of the invention. For example, arrays 34 and 40 have been shown as vertically configured. This, however, is not a necessary requirement of the present invention; any configuration that unambiguously communicates the position and closing rate of an overtaking vehicle is intended to be within the scope of this invention. The scope of this invention is therefore not intended to be limited to the particular structures disclosed herein, but should instead be gauged by the breadth of the claims that follow.

What is claimed is:

1. A device for an automotive vehicle comprising:
a multibeam radar system having a transmit/receive module mounted on a side surface of said vehicle to provide a plurality of antenna beams with each of the antenna beams pointing in one of a plurality of discrete angular sectors emanating from the side surface of said vehicle, wherein in response to the presence of an obstacle in one of the plurality of antenna beams, the multibeam radar system provides a corresponding one of a plurality of sector signals signifying the presence of an obstacle within the corresponding discrete angular sector; and
an equal number of indicators as the plurality of antenna beams, each of said indicators responsive to a predetermined one of the plurality of sector signals and each of said indicator adapted to provide a visual indication of the presence of an obstacle within a corresponding discrete angular sector.

2. The device in accordance with claim 1, wherein said multibeam radar system scans at least four equiangular beams.

3. The device in accordance with claim 1, wherein said multibeam radar system scans over a range of between 90 and 180 degrees.

4. The device in accordance with claim 1, wherein said transmit/receive module is positioned toward the rear of said vehicle.

5. The device in accordance with claim 1, wherein said multibeam radar system scans a first beam toward a rearward position relative to said vehicle, each subsequent beam toward a more forward position relative to said vehicle than the previous beam and a final beam toward a most forward position relative to said vehicle.

6. The device in accordance with claim 1, wherein said multibeam radar system is programmable to limit the range of detection by each individual beam.

7. The device in accordance with claim 6, wherein said multibeam radar system is programmed to detect obstacles only in a highway lane adjacent said side surface of said vehicle.

8. The device in accordance with claim 1, wherein said indicators comprise light-emitting diodes (LEDs).

9. The device in accordance with claim 1, wherein said indicators are positioned on an outside mirror of said vehicle, said outside mirror being located on the same side of said vehicle as said transmit/receive module.

10. The device in accordance with claim 5, wherein said indicators are configured in a vertical column, the bottommost indicator being responsive to obstacle detection by said first beam, each subsequent indicator above said bottommost indicator being responsive to obstacle detection by said subsequent beams, and the topmost indicator being responsive to obstacle detection by said final beam.

11. A device for an automotive vehicle comprising:
a first multibeam radar system having a first transmit/receive module mounted on a left side surface of said vehicle, said first radar system to provide a plurality of beams at discrete angular sectors along the left side of said vehicle, said first radar system to provide a first plurality of signals signifying the presence of an obstacle within a corresponding sector;
an equal number of lefthand indicators as the first plurality of signals, each of said indicators being coupled, respectively, to receive one of said first signals, each lefthand indicator to provide a visual indication of the presence of an obstacle within a corresponding sector at the left side of said vehicle, said lefthand indicators being configured in a first array that meaningfully displays a transition of an obstacle from one of said sectors along the left side of said vehicle to another;
a second multibeam radar system having a second transmit/receive module mounted on a right side surface of said vehicle, said second radar system to provide a plurality of beams at discrete angular sectors along the right side of said vehicle, said second radar system to provide a second plurality of signals signifying the presence of an obstacle within a corresponding sector; and
an equal number of righthand indicators as the second plurality of signals, each of said indicators being coupled, respectively, to receive one of said second. signals, each righthand indicator to provide a visual indication of the presence of an obstacle within a corresponding sector at the right side of said vehicle, said righthand indicators being configured in a second array that meaningfully displays a transition of an obstacle from one of said sectors along the right side of said vehicle to another.

12. The device in accordance with claim 11, wherein said first and second multibeam radar systems each scan at least four equiangular beams over a range of between 90 to 180 degrees.

13. The device in accordance with claim 11, wherein said first and second transmit/receive modules are positioned toward the rear of said vehicle.

14. The device in accordance with claim 11, wherein said first and second multibeam radar systems each scan a first beam toward a rearward position relative to said vehicle, each subsequent beam toward a more forward position relative to said vehicle than the previous beam and a final beam toward a most forward position relative to said vehicle.

15. The device in accordance with claim 11, wherein said first and second multibeam radar systems are each programmable to limit the range of detection by each individual beam.

16. The device in accordance with claim 15, wherein said first and second transmit/receive modules of said multibeam radar systems are each programmed to detect obstacles only in a highway lane adjacent said left and right side surface, respectively, of said vehicle.

17. The device in accordance with claim 11, wherein said lefthand and righthand indicators comprise light-emitting diodes (LEDs).

18. The device in accordance with claim 11, wherein said lefthand indicators are positioned on a lefthand outside mirror of said vehicle, and said righthand indicators are positioned on a righthand outside mirror of said.

19. The device in accordance with claim 14, wherein said lefthand and righthand indicators are configured in lefthand and righthand vertical columns, respectively, the bottommost indicator of each column being responsive to obstacle detection by said first beam, each subsequent indicator of each column above said bottommost indicator being responsive to obstacle detection by said subsequent beams, and the topmost indicator of each column being responsive to obstacle detection by said final beam.

20. An automotive device to provide a driver of a host vehicle with an indication of the position and closing speed of an overtaking vehicle in an adjacent highway lane, comprising:
a first multibeam radar system having a first transmit/receive module mounted on a left side surface of said host vehicle toward the rear of said host vehicle, said first radar system to provide at least four beams at equal angular sectors along the left side of said host vehicle, said first radar system to provide an equal number of first signals as the number of beams of said first radar system, said first signals signifying the presence of said overtaking vehicle within a corresponding sector in the leftthand adjacent highway lane;
an equal number of indicators as the number of beams of said first radar system, said indicators being affixed to a lefthand outside mirror of said host vehicle, each lefthand indicator being coupled, respectively, to receive one of said first signals, each lefthand indicator to provide an indication of the presence of an overtaking vehicle within a corresponding sector in the lefthand adjacent highway lane, said lefthand indicators being configured in a column that meaningfully displays a transition of said overtaking vehicle from one of said sectors in the lefthand adjacent highway lane to another;
a second multibeam radar system having a second transmit/receive module mounted on a right side surface of said host vehicle toward the rear of said host vehicle, said second radar system to provide at least four beams at equal angular sectors along the right side of said host vehicle, said second radar system to provide an equal number of second signals as the number of beams of said second radar system, said second signals signifying the presence of said overtaking vehicle within a corresponding sector in the righthand adjacent highway lane; and an equal number of indicators as the number of beams of said second radar system, said indicators being affixed to a righthand outside mirror of said host vehicle, each righthand indicator being coupled, respectively, to receive one of said second signals, each righthand indicator to provide an indication of the presence of an overtaking vehicle within a corresponding sector in the righthand adjacent highway lane, said righthand indicators being configured in a column that meaningfully displays a transition of said overtaking vehicle from one of said sectors in the righthand adjacent highway lane to another.

21. The device of claim 1, wherein said indicators are configured in an array that meaningfully displays a transition of an obstacle from one of said sectors to another.

22. The device of claim 1, wherein said indicators are configured in an array that can be controlled to enable each of said indicators to illuminate to provide the visual indication of the presence of the obstacle within the corresponding sector and to turn off to provide the visual indication of the transition of the obstacle from the corresponding sector.

23. The device of claim 11, wherein angular movement of said obstacle relative to said first multibeam radar system is indicated by actuation of said plurality of lefthand indicators.

24. The device of claim 11, wherein angular movement of said obstacle relative to said first multibeam radar system is indicated by illuminating each of said lefthand indicators to provide the visual indication of the presence of the obstacle within the corresponding sector and by turning off each of said lefthand indicators to provide the visual indication of the transition of the obstacle from the corresponding sector.

25. The device of claim 11, wherein angular movement of said obstacle relative to said first multibeam radar system is indicated by actuation of said plurality of righthand indicators.

26. The device of claim 11, wherein angular movement of said obstacle relative to said first multibeam radar system is indicated by illuminating each of said righthand indicators to provide the visual indication of the presence of the obstacle within the corresponding sector and by turning off each of said righthand indicators to provide the visual indication of the transition of the obstacle from the corresponding sector.

27. The automotive device of claim 20, wherein angular movement of said overtaking vehicle relative to said first multibeam radar system is indicated by actuation of said indicators affixed to said lefthand outside mirror of said host vehicle.

28. The automotive device of claim 20, wherein angular movement of said overtaking vehicle relative to said first multibeam radar system is indicated by illuminating each of said lefthand indicators to indicate the presence of said overtaking vehicle within the corresponding sector and by turning off each of said lefthand indicators to indicate a transition of the vehicle from the corresponding discrete angular sector.

29. The automotive device of claim 20, wherein angular movement of said overtaking vehicle relative to said second multibeam radar system is indicated by actuation of said indicators affixed to said righthand outside mirror of said host vehicle.

30. The automotive device of claim 20, wherein angular movement of said overtaking vehicle relative to said second multibeam radar system is indicated by illuminating each of said righthand indicators to indicate the presence of said overtaking vehicle within the corresponding sector and by turning off each of said righthand indicators to indicate a transition of the vehicle from the corresponding discrete angular sector.

31. The automotive device of claim 20, wherein the indicators include LEDs.

* * * * *